(12) United States Patent
Shimono et al.

(10) Patent No.: US 9,333,419 B2
(45) Date of Patent: May 10, 2016

(54) INFORMATION STORAGE MEDIUM, GAME DEVICE, AND SERVER

(71) Applicant: NAMCO BANDAI GAMES INC., Tokyo (JP)

(72) Inventors: Masataka Shimono, Fujisawa (JP); Shuntaro Watanabe, Ichikawa (JP); Takamasa Kato, Yokohama (JP); Miki Tomisawa, Utsunomiya (JP); Norimasa Matsuura, Yokohama (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 108 days.

(21) Appl. No.: 14/026,750

(22) Filed: Sep. 13, 2013

(65) Prior Publication Data
US 2014/0080599 A1    Mar. 20, 2014

(30) Foreign Application Priority Data
Sep. 19, 2012 (JP) .................................. 2012-206331

(51) Int. Cl.
| A63F 13/00  | (2014.01) |
| A63F 13/833 | (2014.01) |
| A63F 13/53  | (2014.01) |
| A63F 1/00   | (2006.01) |

(52) U.S. Cl.
CPC ................. *A63F 13/00* (2013.01); *A63F 13/53* (2014.09); *A63F 13/833* (2014.09); *A63F 2001/008* (2013.01)

(58) Field of Classification Search
None
See application file for complete search history.

(56) References Cited

U.S. PATENT DOCUMENTS

| 7,033,275    | B1 * | 4/2006  | Endo et al. ..................... 463/33 |
| 8,168,435    | B2   | 5/2012  | Noguchi et al. |
| 2002/0137564 | A1 * | 9/2002  | Kawazu ......................... 463/43 |
| 2005/0054402 | A1 * | 3/2005  | Noguchi et al. ................. 463/5 |
| 2010/0056282 | A1 * | 3/2010  | Yasue ............................. 463/42 |
| 2010/0304806 | A1 * | 12/2010 | Coleman et al. ................ 463/2 |
| 2012/0064969 | A1 * | 3/2012  | Uchibori ........................ 463/29 |

FOREIGN PATENT DOCUMENTS

JP    B2-4133641    8/2008

* cited by examiner

*Primary Examiner* — Jason Yen
(74) *Attorney, Agent, or Firm* — Oliff PLC

(57) ABSTRACT

Input information that selects one card among five cards that are arranged in one direction in a predetermined area of a game screen is received, and a player character is caused to make a motion corresponding to the selected card. When three cards to which an identical attribute is assigned are adjacently disposed in the predetermined area, the three cards are replaced with one card to which the same attribute as that of the three cards is assigned, but which differs in type from the three cards, the card positioned in the rightward direction relative to the replaced cards is shifted in the leftward direction, and an additional two cards are disposed in the space formed by shifting the card.

20 Claims, 10 Drawing Sheets

FIG.7

| ID | ATTRIB-UTE | TYPE | IMAGE DATA | MOTION DATA | EFFECT DATA |
|---|---|---|---|---|---|
| 1 | ○ | ×1 | G001 | M001 | E001 |
| 2 | ○ | ×3 | G002 | M002 | E002 |
| 3 | ○ | ×4 | G003 | M003 | E003 |
| 4 | ○ | ×5 | G004 | M004 | E004 |
| 15 | △ | ×1 | G015 | M015 | E015 |
| 16 | △ | ×3 | G016 | M016 | E016 |
| 17 | △ | ×4 | G017 | M017 | E017 |
| 29 | □ | ×1 | G029 | M029 | E029 |
| 30 | □ | ×3 | G030 | M030 | E030 |
| 31 | □ | ×4 | G031 | M031 | E031 |

200

INFORMATION STORAGE MEDIUM, GAME DEVICE, AND SERVER

Japanese Patent Application No. 2012-206331 filed on Sep. 19, 2012 is hereby incorporated by reference in its entirety.

BACKGROUND OF THE INVENTION

The present invention relates to an information storage medium, a game device, and a server that determine an input performed on a player character corresponding to a selection image selected from N (N is an integer equal to or larger than 3) selection images arranged in a predetermined area of a game screen, and implement a game process.

A game device has been known that is configured so that a predetermined number of cards (hands) that respectively indicate an instruction issued to a player character are displayed in the lower area of the game screen, the player issues an instruction to the player character by selecting an arbitrary card, and cards are supplemented from a deck in the number of the selected cards (see Japanese Patent No. 4133641, for example). The above game device is configured so that cards are synthesized when the combination of the selected cards satisfies a predetermined condition to provide a new card.

According to the above game device, the player can issue only the instruction indicated by each card displayed as a hand to the character player. Therefore, when a plurality of cards that indicate an identical instruction are displayed as hands, the player must select an instruction from a limited number of instructions. In this case, a plurality of cards that indicate an identical instruction may be displayed one on top of another. However, it may be difficult for the player to select a card when using such measures.

SUMMARY

According to a first aspect of the invention, there is provided a computer-readable information storage medium storing a program that determines an input performed on a player character corresponding to a selection image selected from N (N is an integer equal to or larger than 3) selection images arranged in a predetermined area of a game screen, and implements a game process, the program causing a computer to function as:

a game processing section that performs a game process corresponding to the selected selection image; and a selection image control section that deletes the selected selection image from the predetermined area, and disposes an additional selection image in the predetermined area in place of the deleted selection image, the selection image control section replacing M (M is an integer equal to or larger than 2 and equal to or smaller than N) selection images to which an identical attribute is assigned and which are adjacently disposed in the predetermined area with one selection image that differs from the M selection images, and disposing an additional M−1 selection images in the predetermined area.

According to a second aspect of the invention, there is provided a game device that determines an input performed on a player character corresponding to a selection image selected from N (N is an integer equal to or larger than 3) selection images arranged in a predetermined area of a game screen, and implements a game process, the game device including:

a game processing section that performs a game process corresponding to the selected selection image; and a selection image control section that deletes the selected selection image from the predetermined area, and disposes an additional selection image in the predetermined area in place of the deleted selection image, the selection image control section replacing M (M is an integer equal to or larger than 2 and equal to or smaller than N) selection images to which an identical attribute is assigned and which are adjacently disposed in the predetermined area with one selection image that differs from the M selection images, and disposing an additional M−1 selection images in the predetermined area.

According to a third aspect of the invention, there is provided a server that determines an input performed on a player character corresponding to a selection image selected from N (N is an integer equal to or larger than 3) selection images arranged in a predetermined area of a game screen of an information processing terminal that is connected to the server through a network, and implements a game process, the server including:

a game processing section that performs a game process corresponding to the selected selection image; and a selection image control section that deletes the selected selection image from the predetermined area, and disposes an additional selection image in the predetermined area in place of the deleted selection image, the selection image control section replacing M (M is an integer equal to or larger than 2 and equal to or smaller than N) selection images to which an identical attribute is assigned and which are adjacently disposed in the predetermined area with one selection image that differs from the M selection images, and disposing an additional M−1 selection images in the predetermined area.

BRIEF DESCRIPTION OF THE SEVERAL VIEWS OF THE DRAWING

FIG. 7 illustrates an example of table information about cards (or selection images).

DETAILED DESCRIPTION OF THE EMBODIMENT

Figure 1:
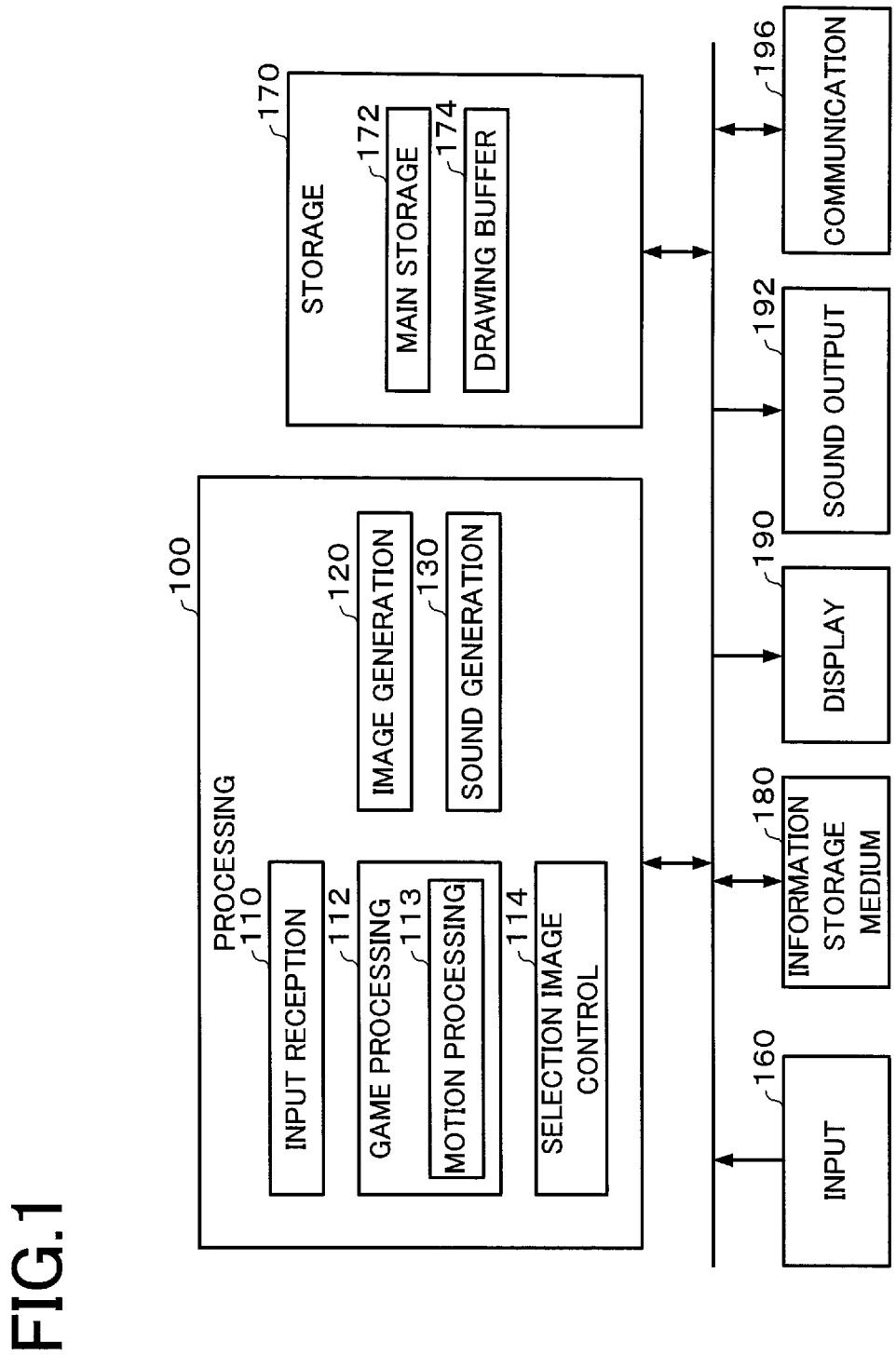
FIG. 1 is a functional block diagram illustrating an example of a game system (or a game device) according to one embodiment of the invention.

The invention may provide an information storage medium, a game device, and a server that can implement a more strategic game while ensuring that the player can perform various inputs on a character.

(1) According to one embodiment of the invention, a computer-readable information storage medium stores a program that determines an input performed on a player character corresponding to a selection image selected from N (N is an integer equal to or larger than 3) selection images arranged in a predetermined area of a game screen, and implements a game process, the program causing a computer to function as:

a game processing section that performs a game process corresponding to the selected selection image; and a selection image control section that deletes the selected selection image from the predetermined area, and disposes an additional selection image in the predetermined area in place of the deleted selection image, the selection image control section replacing M (M is an integer equal to or larger than 2 and equal to or smaller than N) selection images to which an identical attribute is assigned and which are adjacently disposed in the predetermined area with one selection image that differs from the M selection images, and disposing an additional M−1 selection images in the predetermined area.

According to one embodiment of the invention, a game device determines an input performed on a player character corresponding to a selection image selected from N (N is an integer equal to or larger than 3) selection images arranged in a predetermined area of a game screen, and implements a game process, the game device including the above sections. According to one embodiment of the invention, a server determines an input performed on a player character corresponding to a selection image selected from N (N is an integer equal to or larger than 3) selection images arranged in a predetermined area of a game screen of an information processing terminal that is connected to the server through a network, and implements a game process, the server including the above sections.

According to the above embodiments, since M selection images to which an identical attribute is assigned and which are adjacently disposed in the predetermined area are replaced with one selection image that differs from the M selection images, and an additional M−1 selection images are disposed in (supplemented to) the predetermined area, it is possible to prevent a situation in which a plurality of selection images to which an identical attribute are assigned are disposed in the predetermined area, and the player can perform only a limited number of inputs on the character. Moreover, since the player can obtain a new selection image by selecting a selection image among a plurality of selection images taking account of the arrangement of the selection images so that M selection images to which an identical attribute is assigned are adjacently disposed in the predetermined area, the player can enjoy a strategic image selection process.

(2) In each of the information storage medium, the game device, and the server, the selection image control section may shift the selection image positioned in a predetermined direction relative to the deleted selection image in a direction opposite to the predetermined direction so that a space formed by the deletion is occupied by the shifted selection image, dispose an additional selection image in a space formed by the shift, shift the selection image positioned in the predetermined direction relative to the replaced selection images in the direction opposite to the predetermined direction so that a space formed by the replacement is occupied by the shifted selection image, and dispose an additional M−1 selection images in a space formed by the shift.

(3) In each of the information storage medium, the game device, and the server, the one selection image may be a selection image to which an attribute identical to that of the M selection images is assigned.

(4) In each of the information storage medium, the game device, and the server, the game processing section may count the total number of selection images that have been replaced with one selection image each time replacement occurs, and perform the game process that corresponds to a count value corresponding to the selected selection image.

According to the above configuration, the player can obtain a selection image having a large count value each time replacement occurs, and enjoy a strategic image selection process.

(5) The information storage medium may store the program that causes the computer to further function as an input reception section that receives input information that has been input through a touch panel that includes an input section that allows a player to select a selection image among the selection images, and a display section that displays the selection images.

Each of the game device and the server may further include an input reception section that receives input information that has been input through a touch panel that includes an input section that allows a player to select a selection image among the selection images, and a display section that displays the selection images.

(6) The information storage medium may store the program that causes the computer to further function as an image generation section that generates a game image that includes an area in which the player character is disposed, and the predetermined area in which the selection images are disposed.

Each of the game device and the server may further include an image generation section that generates a game image that includes an area in which the player character is disposed, and the predetermined area in which the selection images are disposed.

(7) In each of the information storage medium, the game device, and the server, the game processing section may cause the player character to make a motion corresponding to the selected selection image.

Exemplary embodiments of the invention are described below. Note that the following exemplary embodiments do not unduly limit the scope of the invention as stated in the claims. Note also that all of the elements described in connection with the following exemplary embodiments should not necessarily be taken as essential elements of the invention.

1. Configuration

FIG. 1 is a functional block diagram illustrating an example of a game system (game device) according to one embodiment of the invention. Note that the game system according to one embodiment of the invention may have a configuration in which some of the elements (sections) illustrated in FIG. 1 are omitted.

An input section 160 is a device that detects information (input information) input by the player, and outputs the information input by the player to a processing section 100. The function of the input section 160 may be implemented by an input device (e.g., touch panel (touch panel display), touch pad, mouse, direction key, button, and keyboard) or an indicator (e.g., a controller that includes an inertial sensor (e.g., acceleration sensor) and an imaging section (camera)) that is used to indicate an arbitrary position on a screen.

A storage section 170 serves as a work area for the processing section 100, a communication section 196, and the like. The function of the storage section 170 may be implemented by a RAM (VRAM) or the like. The storage section 170 includes a main storage section 172 that is used as a work area, and a drawing buffer 174 that stores the final display image and the like.

An information storage medium 180 (computer-readable medium) stores a program, data, and the like. The function of the information storage medium 180 may be implemented by an optical disk (CD or DVD), a magneto-optical disk (MO), a magnetic disk, a hard disk, a magnetic tape, a memory (ROM), or the like. The processing section 100 performs various processes according to one embodiment of the invention based on a program (data) stored in the information storage medium 180. Specifically, a program that causes a computer to function as each section according to one embodiment of the invention (i.e., a program that causes a computer to execute the process performed by each section) may be stored in the information storage medium 180.

A display section 190 outputs a game image generated by the processing section 100. The function of the display section 190 may be implemented by a display (e.g., LCD, CRT, or touch panel display). Note that the display section 190 may be implemented by one display, or may be implemented by a first display that displays selection images, and a second display that displays a player character.

A sound output section 192 outputs sound generated by the processing section 100. The function of the sound output section 192 may be implemented by a speaker, a headphone, or the like.

The communication section 196 performs various control processes for communicating with another game system and a server. The function of the communication section 196 may be implemented by hardware such as a processor or a communication ASIC, a program, or the like.

Note that the game system may receive a program and data that cause a computer to function as each section of the processing section 100 from an information storage medium or a storage section included in a server through a network, and store the received program and data in the information storage medium 180 or the storage section 170. A case where the game system is operated based on the program and data received from the server is also included within the scope of the invention.

The processing section 100 (processor) performs a game process, an image generation process, a sound generation process, and the like based on the input information output from the input section 160, data received through the communication section 196, and the like. The processing section 100 performs various processes using the main storage section 172 as a work area. The function of the processing section 100 may be implemented by hardware such as a processor (e.g., CPU or DSP) or an ASIC (e.g., gate array), or a program.

The processing section 100 includes an input reception section 110, a motion processing section 112, a selection image control section 114, an image generation section 120, and a sound generation section 130.

The input reception section 110 receives the input information (e.g., an indication position on the game screen detected by a touch panel or the like) output from the input section 160 (e.g., touch panel, touch pad, mouse, or indicator). More specifically, the input reception section 110 receives the input information that selects (indicates) one selection image among N (N is an integer equal to or larger than 3) selection images arranged in one direction in a predetermined area of the game screen.

The game processing section 112 performs a game process corresponding to the selected selection image. The game processing section 112 includes a motion processing section 113. The motion processing section 113 controls the movement and the motion of a player character and an enemy character (non-player character) disposed in the game space. More specifically, the motion processing section 113 causes the player character to make a motion (e.g., a motion that attacks the enemy character, a movement motion, or a defense motion) corresponding to the selected selection image based on the input information received by the input reception section 110.

The motion processing section 113 causes the player character to make a motion based on motion data corresponding to the selected selection image. The motion processing section 113 may cause the player character to make a different motion corresponding to an attribute that is set to the selected selection image.

The motion processing section 113 causes the player character to make a motion corresponding to a selection image that has been selected when the player character is making a motion after the motion that is currently made by the player character when the relationship between the motion corresponding to the selected selection image and the motion that is currently made by the player character satisfies a predetermined condition, and cancels the input corresponding to the selected selection image when the relationship between the motion corresponding to the selected selection image and the motion that is currently made by the player character does not satisfy the predetermined condition. The motion processing section 113 may determine that the relationship between the motion corresponding to the selected selection image and the motion that is currently made by the player character satisfies the predetermined condition when the motion that is currently made by the player character and the motion corresponding to the selected selection image can be made smoothly in a consecutively manner. The motion processing section 113 may also determine whether or not the relationship between the motion corresponding to the selected selection image and a motion that is automatically made by the player character satisfies the predetermined condition.

The motion processing section 113 may cause the player character to make an attack motion by causing the player character to make the motion corresponding to the selected selection image, and may automatically cause the player character to make a movement motion or a defense motion based on a given algorithm. For example, the motion processing section 113 may automatically cause the player character to move closer to the enemy character when the distance between the player character and the enemy character is equal to or longer than a given value, and may automatically cause the player character to make a defense motion when no input has been performed for a given period.

The motion processing section 113 may change a parameter of the enemy character when the enemy character is positioned within a hit area that is set to the motion corresponding to the selected selection image. The motion processing section 113 may maintain the input corresponding to the selected selection image, and may cause the player character to make the motion corresponding to the selected selection image regardless of whether or not the enemy character is positioned within the hit area that is set to the motion corresponding to the selected selection image.

The selection image control section 114 disposes (displays) N selection images that respectively indicate a motion that is made by the player character (i.e., an instruction issued to the player character) in a predetermined area of the game screen.

The selection image control section 114 deletes the selected selection image from the predetermined area based on the input information received by the input reception section 110, and disposes an additional selection image in the predetermined area in place of the deleted selection image.

The selection image control section 114 replaces M (M is an integer equal to or larger than 2 and equal to or smaller than N) selection images to which an identical attribute is assigned and which are adjacently disposed in the predetermined area with one selection image that differs from the M selection images (e.g., a selection image to which the same attribute as that of the M selection images is assigned, but which differs in type from the M selection images), and disposes an additional M−1 selection images.

The selection image control section 114 may shift the selection image positioned in a predetermined direction relative to the deleted selection image in the direction opposite to the predetermined direction so that the space formed by the deletion is occupied by the shifted selection image, may dispose an additional selection image in the space formed by the shift, may shift the selection image positioned in the predetermined direction relative to the replaced selection images in the direction opposite to the predetermined direction so that the space formed by the replacement is occupied by the shifted selection image, and may dispose an additional M−1 selection images in the space formed by the shift.

The game processing section 112 may count the total number of selection images that have been replaced with one selection image each time replacement occurs, and may perform the game process that corresponds to the count value corresponding to the selected selection image (e.g., a process that causes the player character to make a motion corresponding to the count value, or a process that changes a parameter of the enemy character corresponding to the count value).

When the selection image generated as a replacement has been selected, the motion processing section 113 may cause the player character to make a motion that differs from the motion made by the player character when the selection image that is not generated as a replacement has been selected.

The selection image control section 114 may delete the selected selection image from the predetermined area only when the selection image has been selected when the player character is making a motion, and it has been determined that the relationship between the motion corresponding to the selected selection image and the motion that is currently made by the player character satisfies the predetermined condition.

The image generation section 120 performs a drawing process based on the results of various processes performed by the processing section 100 to generate a game image, and outputs the generated game image to the display section 190. The image generation section 120 may output a game image that includes the predetermined area in which the selection images are disposed, and an area in which the player character is disposed, to one display (display section 190), or may output a game image that includes the predetermined area in which the selection images are disposed to a first display, and output a game image that includes an area in which the player character is disposed to a second display (e.g., touch panel). The image generation section 120 may generate an image (three-dimensional image) viewed from a virtual camera (given viewpoint) in an object space.

The image generation section 120 (display control section) may display information that indicates that the input corresponding to the selected selection image has been canceled so that the player can visually observe the information when it has been determined that the relationship between the motion corresponding to the selected selection image and the motion that is currently made by the player character does not satisfy the predetermined condition.

The sound generation section 130 performs a sound generation process based on the results of various processes performed by the processing section 100 to generate a game sound such as background music (BGM), effect sound, or voice, and outputs the generated game sound to the sound output section 192.

The game system according to one embodiment of the invention may be implemented by a server. The server may be implemented by a single server, or may be implemented by a plurality of servers (e.g., authentication server, game processing server, communication server, accounting server, and database server). The server performs the process performed by each section of the processing section 100 (i.e., the process that receives the input information, the process that controls the motion of the player character, the process that controls the selection images, and the image generation process) based on input information (i.e., data input using an input section of an information processing terminal (e.g., an indication position on the game screen detected by an information processing terminal) transmitted from one or a plurality of information processing terminals (e.g., an arcade game device, a portable game device, or a mobile phone that can execute a program) connected to the server through a network to generate image generation data for generating an image, and transmits the generated image generation data to each information processing terminal. Note that the image generation data refers to data for displaying an image generated by the method according to one embodiment of the invention on each information processing terminal. The image generation data may be image data, or may be data (e.g., object data and game processing result data) that is used when each information processing terminal generates an image.

The game system according to one embodiment of the invention may be implemented by a game system that includes a server, and an information processing terminal connected to the server through a network. In this case, a processing section of the information processing terminal may perform the game process (i.e., the process that receives the input information, the process that controls the motion of the player character, the process that controls the selection images, and the image generation process) based on a program transmitted (downloaded) from the server, and the server may update data (e.g., data relating to an acquired item or a score) linked to each player (each information processing terminal) based on game result data transmitted from the information processing terminal.

2. Method

A method according to one embodiment of the invention is described below with reference to the drawings.

The game system according to one embodiment of the invention is configured to implement a game in which the player causes a player character to attack an enemy character by selecting one selection image among a plurality of selection images arranged in a predetermined area of the game screen using the input section 160.

Figure 2:
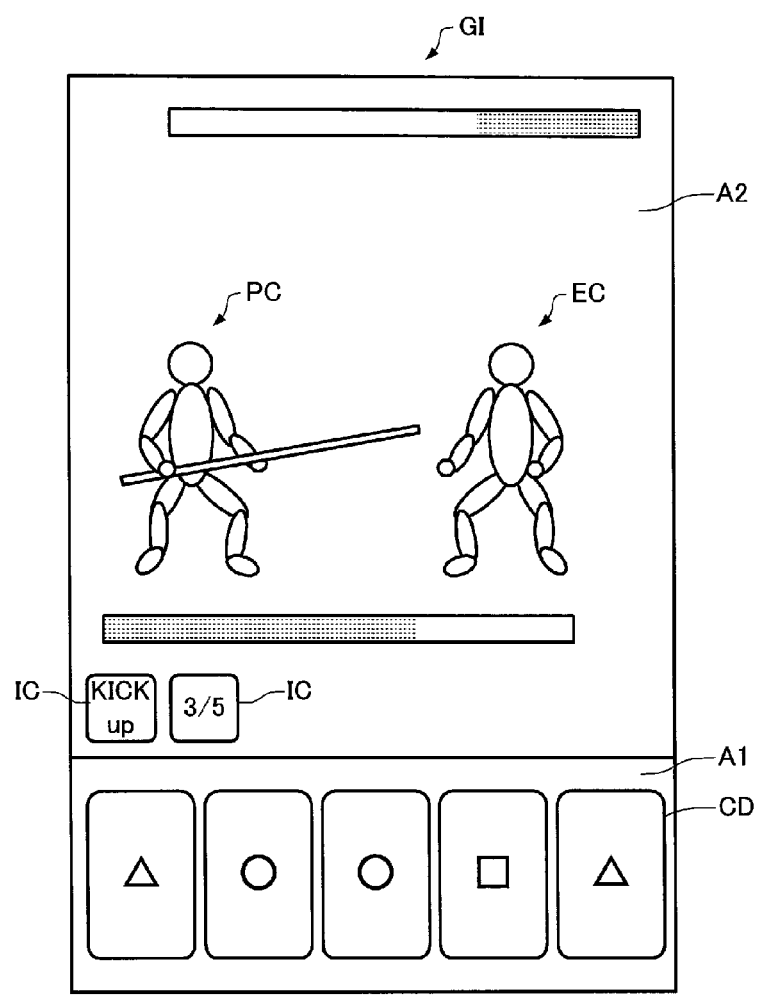
FIG. 2 is a diagram illustrating an example of a game screen generated by a game system (or a game device) according to one embodiment of the invention.

FIG. 2 is a diagram illustrating an example of a game screen (or a game image) that is generated by the game system according to one embodiment of the invention. A game screen GI illustrated in FIG. 2 corresponds to the display screen of a touch panel display (i.e., the display section 190 that includes a touch panel (i.e., input section 160)). The player selects an arbitrary selection image by touching the touch panel (performing a touch operation) with a fingertip, a touch pen, or the like.

As illustrated in FIG. 2, the game screen GI includes a first area A1 (i.e., predetermined area) in which the selection images are displayed, and a second area A2 in which a player character PC and an enemy character EC are displayed.

A plurality of cards CD (i.e., selection images) that are arranged in one direction are displayed in the first area A1 of the game screen GI. In the example illustrated in FIG. 2, five (N) cards CD are arranged in the lateral direction. A mark among three marks "○", "Δ", and "□" is assigned to each card CD as an attribute. Each attribute indicates an attack motion that is made by the player character PC. For example, the attribute "○" indicates a vertical slash attack motion that swings a sword vertically, the attribute "Δ" indicates a horizontal slash attack motion that swings a sword horizontally, and the attribute "□" indicates a kick attack motion. Note that the attribute assigned to each card CD arranged in the first area A1 is determined by a lottery.

When the player has selected an arbitrary card CD from the five cards CD (hands) arranged in the first area A1 by touching the touch panel, the player character PC makes the attack motion corresponding to the attribute assigned to the selected card CD. When the attack motion is effective (i.e., when the enemy character EC is present in the hit area set to the attack motion), a game process that causes the player character PC to attack the enemy character EC, and a game effect process (e.g., a process that changes the parameter of the enemy character EC (e.g., a process that reduces the strength value), a process that causes the enemy character EC to make a motion that indicates that the enemy character EC is attacked by the player character PC, and a score calculation process) are performed.

When the player has selected an arbitrary card CD from the five cards CD arranged in the first area A1, the selected card CD is deleted, and one card CD is drawn from a virtual stock, and added to the first area A1. The attribute assigned to the card CD added to the first area A1 is also determined by a lottery.

Figure 3:
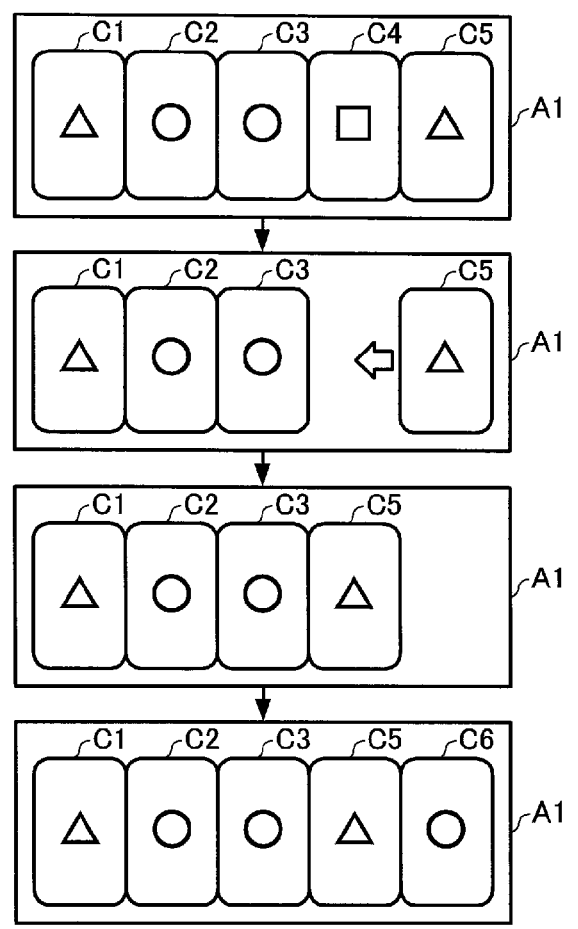
FIG. 3 is a diagram illustrating a card (or a selection image) control process.

In the example illustrated in FIG. 3, when the card C4 has been selected, the selected card C4 is deleted, and the card C5 positioned in the rightward direction (i.e., predetermined direction) relative to the deleted card C4 is shifted in the leftward direction so that the card C5 is positioned adjacent to the card C3. A new card C6 is then placed in the space formed on the right of the card C5.

When three or four (M) cards CD to which an identical attribute is assigned are adjacently disposed in the first area A1, the M cards CD are replaced with one card CD to which the same attribute as that of the M cards CD is assigned, but which differs in type from the M cards CD.

Figure 4:
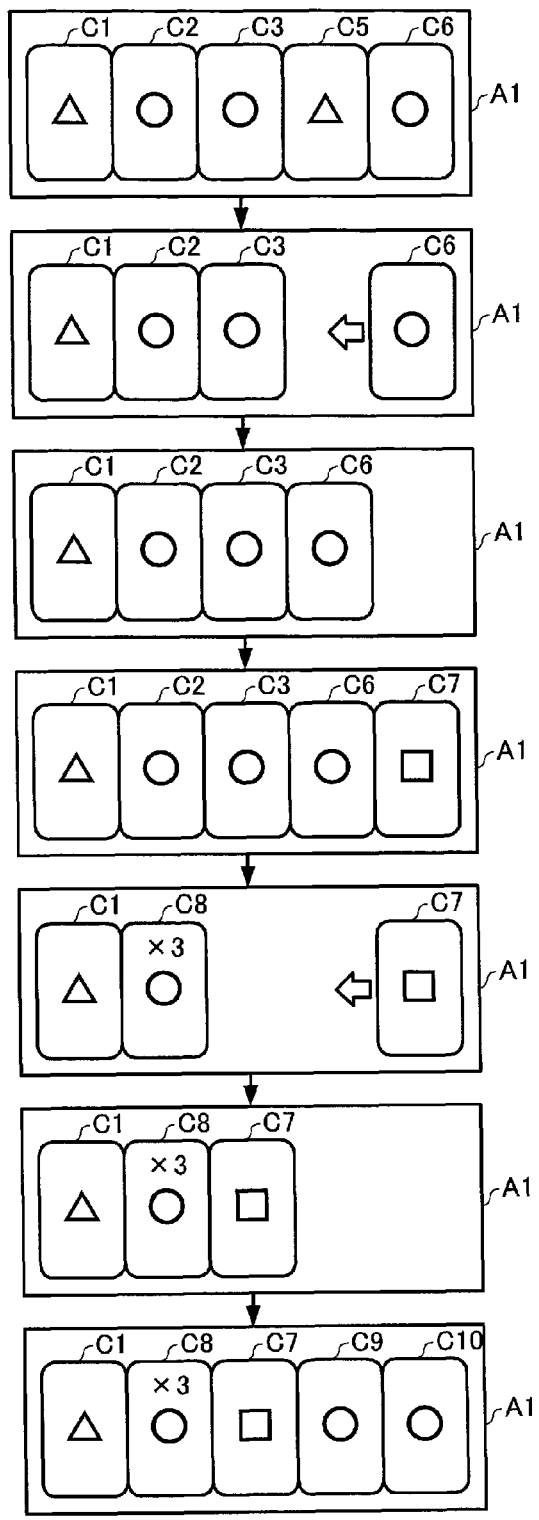
FIG. 4 is a diagram illustrating a card (or a selection image) control process.

In the example illustrated in FIG. 4, when the card C5 has been selected, the selected card C5 is deleted, the card C6 positioned in the rightward direction relative to the deleted card C5 is shifted in the leftward direction, and a new card C7 is placed in the space formed on the right of the card C6. In this case, since three cards C2, C3, and C6 to which the attribute "○" is assigned are adjacently disposed in the first area A1, the cards C2, C3, and C6 are replaced with a new card C8 to which the attribute "○" is assigned. The card C7 positioned in the rightward direction relative to the card C8 is then shifted in the leftward direction, and two (M−1) cards C9 and C10 are placed in the space formed on the right of the card C7.

As illustrated in FIG. 4, a mark "×3" that indicates that three cards were replaced (i.e., a mark that indicates that the count value is "3") is assigned to the card C8 generated as a replacement, and indicates that the card C8 differs in type from a card to which the attribute "○" is assigned. Specifically, a card is generated to which the same attribute as that of the replacement cards is assigned, but which differs in type from the replacement cards. The number of cards that were replaced is counted, and the count value is set to the card generated as a replacement.

Note that the card generated as a replacement may also be replaced with another card. In the example illustrated in FIG. 5, when the card C7 has been selected, the selected card C7 is deleted, the cards C9 and C10 positioned in the rightward direction relative to the deleted card C7 are shifted in the leftward direction, and a new card C11 is placed in the space formed on the right of the card C10. In this case, since three cards C8, C9, and C10 to which the attribute "○" is assigned are adjacently disposed in the first area A1, the cards C8, C9, and C10 are replaced with a new card C12 to which the attribute "○" is assigned. The card C11 positioned in the rightward direction relative to the card C12 is then shifted in the leftward direction, and two new cards C13 and C14 are placed in the space formed on the right of the card C11.

Figure 5:
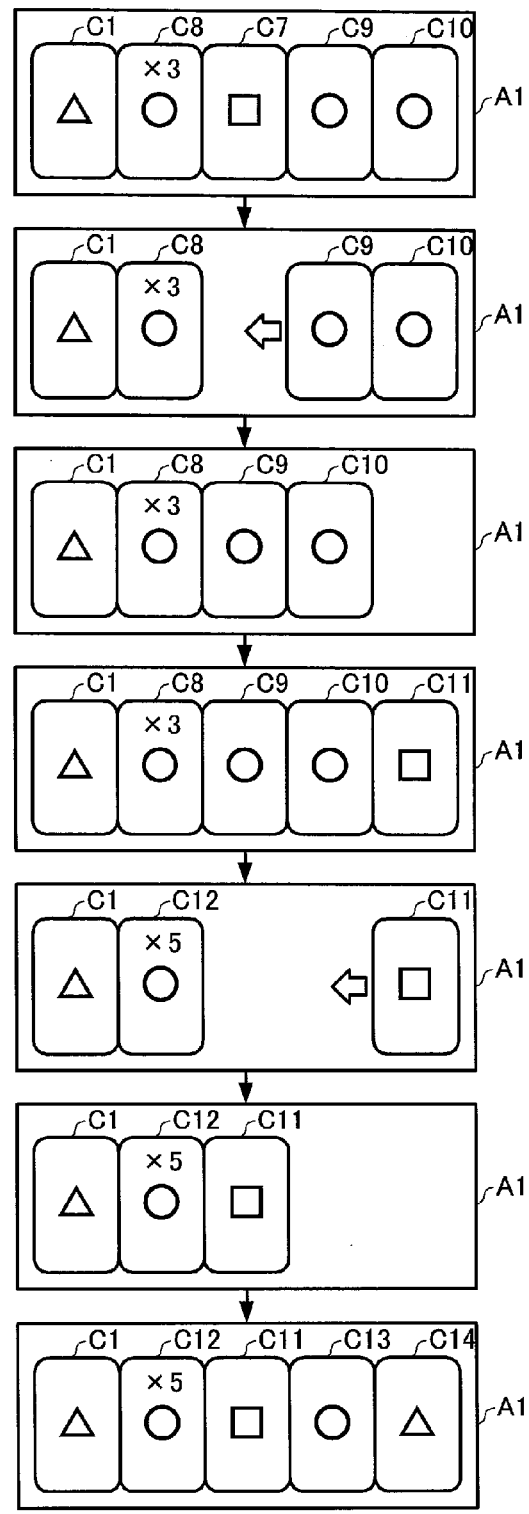
FIG. 5 is a diagram illustrating a card (or a selection image) control process.

Since the card C12 has been generated to replace the card C8 that replaced the three cards, and the cards C9 and C10, a mark "×5" that indicates that five cards were replaced with the card C12 in total (i.e., a mark that indicates that the count value is "5") is assigned to the card C12 (see FIG. 5). Specifically, a count value "5" calculated by adding the number "2" of the cards C9 and 10 to the count value "3" of the card C8 is set to the card C12 generated as a replacement. A new card that differs in type from the replacement cards can thus be generated as a replacement for the card that was generated as a replacement and an additional card.

Although an example in which three cards CD are replaced with one card CD (i.e., M=3) has been described above, four cards CD may be replaced with one card CD (i.e., M=4) depending on the arrangement of the cards CD in the first area A1.

Figure 6:
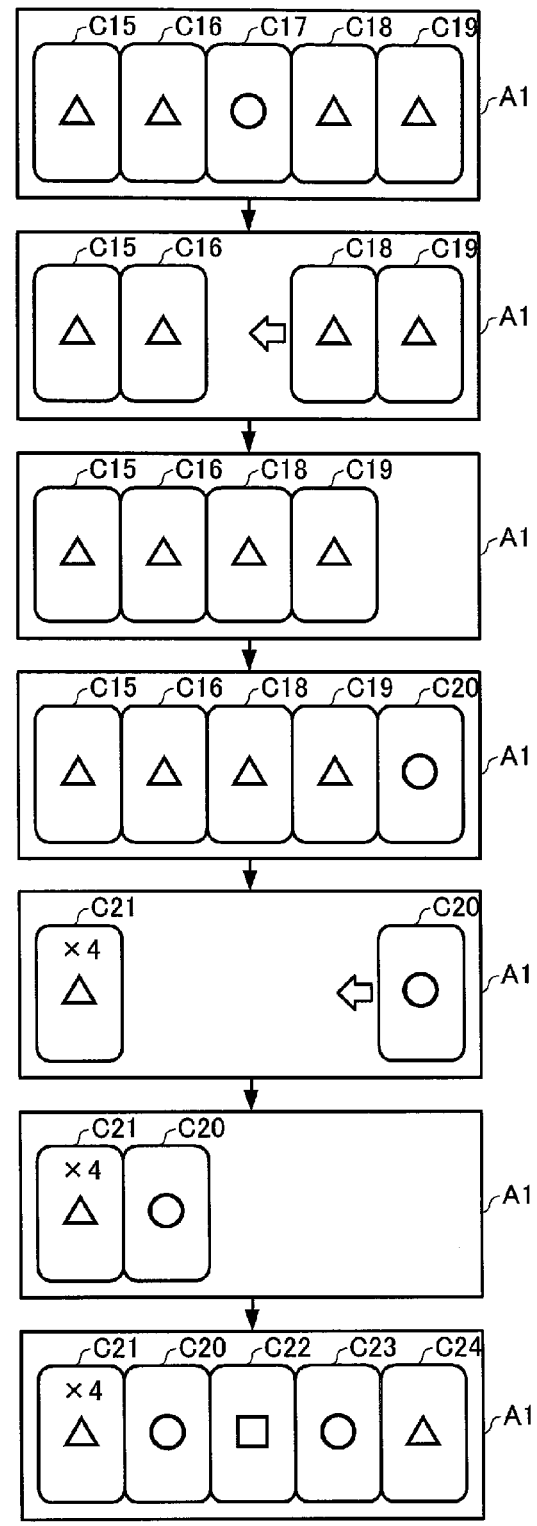
FIG. 6 is a diagram illustrating a card (or a selection image) control process.

In the example illustrated in FIG. 6, when the card C17 has been selected, the selected card C17 is deleted, the cards C18 and C19 positioned in the rightward direction relative to the deleted card C17 are shifted in the leftward direction, and a new card C20 is placed in the space formed on the right of the card C19. In this case, since four cards C15, C16, C18, and C19 to which the attribute "Δ" is assigned are adjacently disposed in the first area A1, the cards C15, C16, C18, and C19 are replaced with a new card C21 to which the attribute "Δ" is assigned. The card C20 positioned in the rightward direction relative to the card C21 is then shifted in the leftward direction, and three (M−1) cards C22, C23, and C24 are placed in the space formed on the right of the card C20. A mark "×4" that indicates that four cards were replaced with the card D21 is assigned to the card D21 (see FIG. 6).

FIG. 7 illustrates an example of table information about the cards CD. Table information 200 illustrated in FIG. 7 is stored in the storage section 170. The selection image control section 114 controls the cards CD arranged in the first area A1 referring to the table information 200, and the motion processing section 112 causes the player character PC to make a motion referring to the table information 200 when the player has selected a card CD among the cards CD arranged in the first area A1, for example.

The table information 200 is a data set that includes a card ID, a card attribute, a card type (count value), card image data, motion data that specifies a motion that is made by the player character PC when the card has been selected, effect data that indicates an effect (e.g., an attack capability, a damage level applied to the enemy character EC, and the size of the attack range (hit area)) that occurs when the card has been selected, and the like. The type "×3", "×4", or "×5" respectively indicates that the card is a replacement for three, four, or five cards, and the type "×1" indicates that the card is not a replacement.

As illustrated in FIG. 7, the motion data and the effect data that differ depending on the attribute and the type of the card CD are set to each card CD. For example, the motion data that indicates a larger motion "vertical slash", and the effect data that indicates a higher effect (e.g., higher attack capability, higher damage level, or larger attack range) are set to the card CD to which the attribute "○" and the type "×3" are assigned as compared with the card CD to which the attribute "○" and the type "×1" are assigned. This also applies to the cards CD to which the attribute "Δ" or "□" is assigned. Therefore, the player can obtain a card CD with a higher attack capability by causing replacement of a larger number of cards CD. Note that identical motion data may be set to the cards CD to which an identical attribute is assigned and which differ in type, and only the effect data may be set to a different value.

According to the above configuration, since three or four cards to which an identical attribute is assigned and which are adjacently disposed in the first area A1 are replaced with one card CD to which the same attribute as that of the three or four cards is assigned, but which differs in type from the three or four cards, and two or three cards are added to the first area A1, it is possible to prevent a situation in which a plurality of cards to which an identical attribute and an identical type are assigned occupy most of the first area A1, and the number of options for the motion to be made by the player character PC decreases. Moreover, since the player can obtain a card with a higher attack capability by selecting a card among a plurality of cards taking account of the arrangement of the cards so that three or four cards to which an identical attribute is assigned are adjacently disposed in the first area A1, the player can enjoy a strategic card selection process.

Again referring to FIG. 2, an icon IC that indicates the skill of the player character PC is disposed in the second area A2 of the game screen GI. The icon IC indicates an effect that occurs when a predetermined condition has been satisfied. In the example illustrated in FIG. 2, the icon IC "KICK up" indicates that the attack capability corresponding to the card CD to which the attribute "□" is assigned increases when the card CD to which the attribute "○" is assigned has been selected. The icon IC "3/5" indicates that the arrangement of the cards CD in the first area A1 changes so that three cards CD among the five cards CD are assigned with an identical attribute when a predetermined condition has been satisfied (e.g., when the strength value of the enemy character EC has decreased to 50% or less). Note that the attack capability corresponding to the selected card CD may be increased corresponding to the number of consecutive attacks (combo count) when the player character PC has made consecutive attacks.

A case where selection of a card CD is canceled is described below. When the player has selected an arbitrary card CD when the player character PC is making a motion (during motion replay), the player character PC makes the motion corresponding to the selected card CD after the current motion when the motion corresponding to the selected card CD is a motion that can be made after the current motion. When the motion corresponding to the selected card CD is a motion that cannot be made after the current motion (e.g., when the motion corresponding to the selected card CD does not smoothly follow the current motion), selection of the card CD is canceled, and the player character PC does not make the motion corresponding to the selected card CD. In this case, the selected card CD is not deleted from the first area A1.

For example, when the player has selected the card CD that causes the player character PC to make an attack motion when the player character PC is attacked by the enemy character EC and fallen down (attacked motion), selection of the card CD is canceled since the attacked motion does not smoothly follow the attack motion. This makes it possible to prevent a situation in which the player character PC makes unnaturally linked motions, and prevent a situation in which the selected card CD is deleted although the player character PC does not make a motion. When selection of the card CD has been canceled, information that indicates that selection of the card CD has been canceled may be visually displayed to the player. For example, a message or an icon that indicates that selection of the card CD has been canceled may be displayed within the game screen, or the color, size, shape, or the like of the selected card CD may be changed, or the selected card CD may be blinked or vibrated.

In order to prevent a situation in which the player character PC is attacked by the enemy character EC after the player character PC has made the attacked motion, the player character PC may be caused to avoid an attack by the enemy character EC, and then stand up. When the player selected an arbitrary card CD when the player character PC is automatically making a motion, whether or not the motion corresponding to the selected card CD can be made may also be determined. Selection of the card CD may also be canceled when it has been determined that the attack corresponding to the selected card CD fails (e.g., when the distance between the player character PC and the enemy character EC is too long, and the enemy character EC is not present within the hit area set to the attack motion).

Selection of the card CD may not be canceled, and the player character PC may be caused to make the attack motion corresponding to the selected card CD even when it has been determined that the attack motion corresponding to the selected card CD fails. This is effective when the player desires to merely delete the card CD.

An attack motion that can be made after each attack motion is determined in advance, and the player can enjoy a strategic game by selecting an arbitrary card CD or adjusting the number of cards to be replaced so that the player character PC makes consecutive attack motions.

The battle with the enemy character EC ends when the strength value of the player character PC or the enemy character EC has reached 0. The player character PC battles with a stronger enemy character EC in the next stage. The arrangement of the cards CD in the first area A1 when the battle has ended may be maintained in the next stage. When a card CD generated as a replacement is present in the first area A1 when the battle has ended, only the card CD generated as a replacement may be maintained in the next stage. This makes it possible to implement a more strategic game in which the player keeps a card CD with a high attack capability that has been generated to replace a large number of cards CD for the enemy character that appears in the next stage, for example.

3. Process

Figure 8:
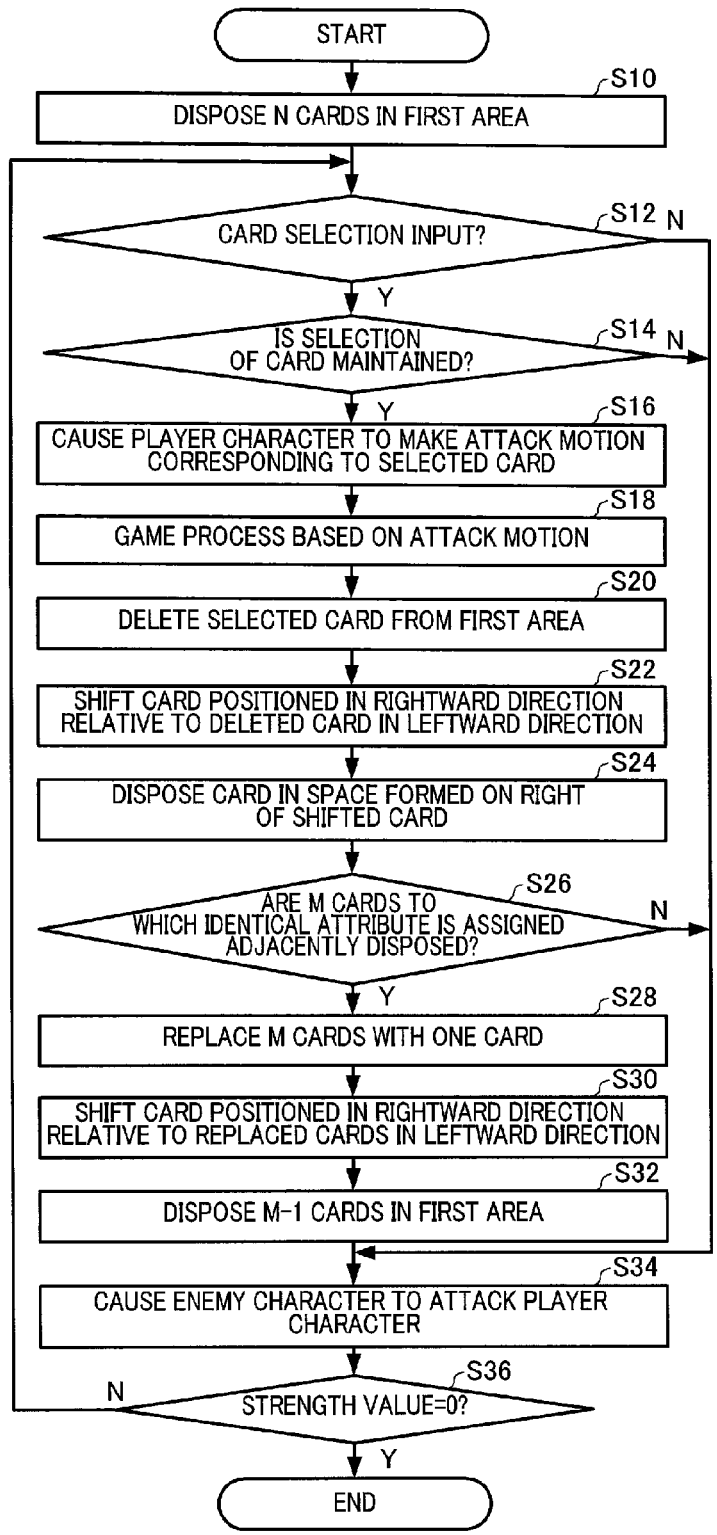
FIG. 8 is a flowchart illustrating the flow of a process according to one embodiment of the invention.

An example of the process performed by the game system according to one embodiment of the invention is described below with reference to FIG. 8 (flowchart).

The selection image control section 114 disposes M (five) cards CD in the first area A1 taking account of the attribute of each card (step S10). The input reception section 110 determines whether or not the player has performed an operation that selects an arbitrary card CD disposed in the first area A1 based on the input information (step S12).

When the input reception section 110 has determined that the player has performed an operation that selects an arbitrary card CD (Y in step S12), the processing section 100 determines whether or not to maintain selection of the card CD (step S14). For example, the processing section 100 determines whether or not the motion corresponding to the selected card CD is a motion that can be made after the current motion, and determines to maintain selection of the card CD when the processing section 100 has determined that the motion corresponding to the selected card CD is a motion that can be made after the current motion. More specifically, a list of motions that can be made after each motion is provided, and the processing section 100 determines to maintain selection of the card CD when the motion corresponding to the selected card CD is included in the list. When the input reception section 110 has determined that the player has not performed an operation that selects an arbitrary card CD (N in step S12), or the processing section 100 has determined to cancel selection of the card CD (N in step S14), a step S34 is performed.

When the processing section 100 has determined to maintain selection of the card CD (Y in step S14), the motion processing section 113 refers to the table information 200, and causes the player character PC to make a motion based on the motion data corresponding to the selected card CD (step S16). The game processing section 112 refers to the table information 200, and performs the game process that calculates an effect that occurs due to the attack motion (e.g., a process that reduces the strength value of the enemy character EC) based on the effect data corresponding to the selected card CD (step S18).

The selection image control section 114 deletes the selected card CD from the first area A1 (step S20), shifts the card CD positioned in the rightward direction relative to the deleted card CD in the leftward direction (step S22), and disposes one card CD in the space formed on the right of the shifted card CD (step S24).

The selection image control section 114 determines whether or not M (three or four) cards CD to which an identical attribute is assigned are adjacently disposed in the first area A1 (step S26), and replaces the M cards CD with a card to which the same attribute as that of the M cards CD is assigned, but which differs in type from the M cards CD (step S28). Note that the type of card to be generated as a replacement is determined based on the total number of cards to be replaced. When the selection image control section 114 has determined that M cards CD to which an identical attribute is assigned are not adjacently disposed in the first area A1 (N in step S26), the step S34 is performed.

The selection image control section 114 then shifts the card CD positioned in the rightward direction relative to the replaced cards CD in the leftward direction (step S30), and disposes M−1 (two or three) cards CD in the space formed on the right of the shifted card CD (step 32).

The game processing section 112 then performs the game process that causes the enemy character EC to attack the player character PC (e.g., a process that reduces the strength value of the enemy character EC) (step S34). The game processing section 112 then determines whether or not the strength value of the enemy character EC or the player character PC has reached 0 (step S36). The step S12 is performed when the game processing section 112 has determined that the strength value has not reached 0, and the steps S12 to S36 are repeatedly performed until the game processing section 112 determines that the strength value of the enemy character EC or the player character PC has reached 0.

4. Modifications

The invention is not limited to the above embodiments. Various modifications and variations may be made of the above embodiments. Any term cited with a different term having a broader meaning or the same meaning at least once in the specification and the drawings may be replaced by the different term in any place in the specification and the drawings.

Although the above embodiments have been described taking an example in which the cards are disposed as the selection images, only characters (letters) may be displayed as the selection images.

Although the above embodiments have been described taking a game in which a plurality of cards are arranged in the predetermined area as the selection images, and the player character is caused to make a motion corresponding to the selected card, the invention is not limited thereto. For example, the invention may also be applied to a game in which a plurality of player characters are disposed in the predetermined area as the selection images, and the selected player character attacks the enemy character.

Figure 9:
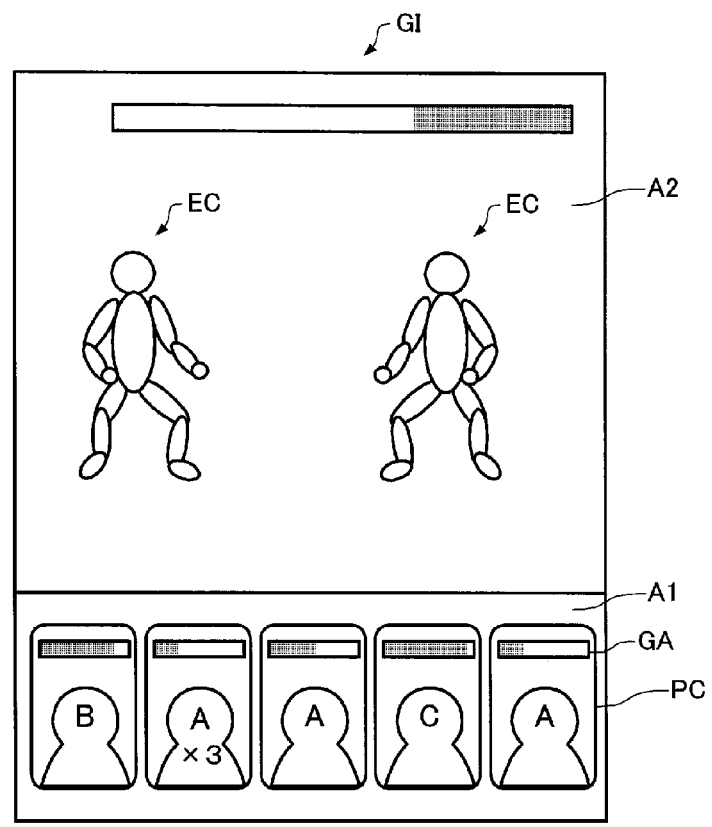
FIG. 9 is a diagram illustrating a modification.

In the example illustrated in FIG. 9, five (N) player characters PC (i.e., selection images) that are arranged in the lateral direction are displayed in the first area A1 of the game screen GI, and the enemy character EC is displayed in the second area A2 of the game screen GI. A mark "A", "B", or "C" is assigned to each player character PC as an attribute. When the player has selected an arbitrary player character PC among the five player characters PC, the selected player character PC attacks the enemy character EC according to the attribute. The selected player character PC is deleted, and an additional player character PC is disposed in the first area A1. Note that the selected player character PC may be deleted on condition that the strength value (i.e., the value indicated by the strength gauge GA) of the selected player character PC has reached 0. Three or four (M) player characters PC to which an identical attribute is assigned and which are adjacently disposed in the first area A1 are replaced with one player character PC, and an additional M−1 player characters PC are disposed in the first area A1 in the same manner as in the above embodiments. The player character PC generated as a replacement is a player character PC to which the same attribute as that of the M player characters PC is assigned, but which has an attack capability higher than that of the M player characters PC. The player character PC illustrated in FIG. 9 to which the attribute "A" and the mark "×3" are assigned is a player character PC generated as a replacement for three adjacent player characters PC to which the attribute "A" is assigned. It is possible to attack the enemy character with a higher attack capability by selecting the above player character PC.

The invention may also be applied to a game in which a plurality of selection images are disposed in the predetermined area, and the player character is moved in the direction corresponding to the selected selection image.

Figure 10:
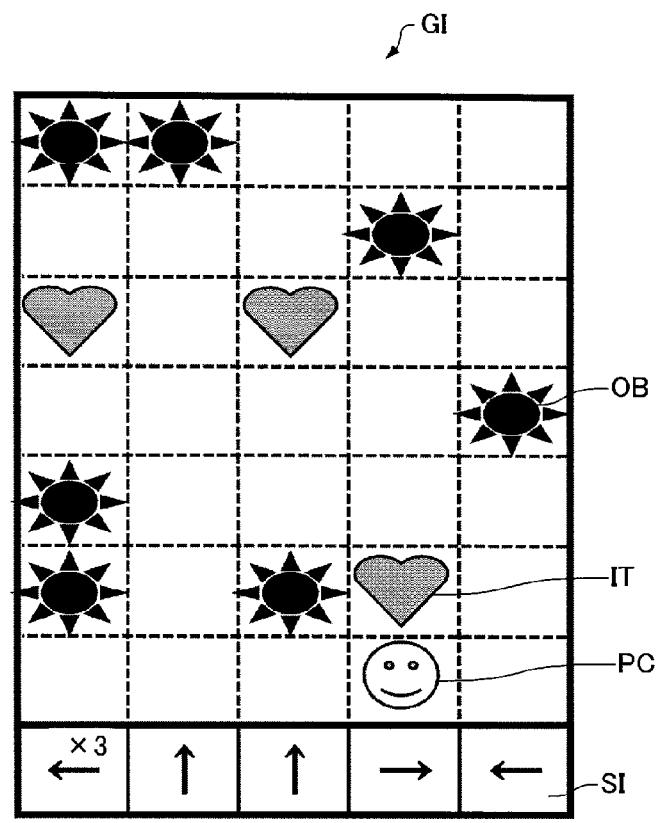
FIG. 10 is a diagram illustrating a modification.

In the example illustrated in FIG. 10, a plurality of selection images SI for designating the moving direction of the player character PC are arranged in the lateral direction in the lower area of the game screen GI, and a player character PC, items IT, and obstacles OB placed within squares are displayed in the upper area of the game screen GI. When the player has selected an arbitrary selection image SI, the player character PC is moved in the direction (i.e., upward direction, leftward direction, or rightward direction) indicated by the selected selection image SI. For example, when the selection image SI to which the attribute "↑" (see FIG. 10) has been selected, the player character PC is moved in the upward direction by one square to acquire the item IT. The selected selection image SI is deleted, and an additional selection image SI is disposed in the lower area of the game screen GI. M selection images SI to which an identical attribute is assigned and which are adjacently disposed in the lower area of the game screen GI are replaced with one selection image SI, and an additional M−1 selection images SI are disposed in the lower area of the game screen GI in the same manner as in the above embodiments. The selection image SI generated as a replacement is a selection image SI to which the same attribute as that of the M selection images SI is assigned, but which provides a moving amount larger than that of the M selection images SI. The selection image SI illustrated in FIG. 10 to which the attribute "←" and the mark "×3" are assigned is a selection image SI generated as a replacement for three adjacent selection images SI to which the attribute "←" is assigned. It is possible to move the player character PC by three squares in the leftward direction by selecting the above selection image SI.

What is claimed is:

1. A non-transitory computer-readable information storage medium storing a program that causes a touch panel device to:
    receive, by detecting by the touch panel device, an input corresponding to a selection of a selection image from N selection images arranged in a predetermined area of a screen of the touch panel device;
    implement and perform a game process corresponding to the selected selection image, wherein the game process causes a game character to make a motion or a movement corresponding to the selected selection image;
    delete the selected selection image from the predetermined area of the screen;
    display, on the screen, an additional selection image in the predetermined area in place of the deleted selection image;
    replace, on the screen, M selection images to which an identical attribute is assigned and which are adjacently disposed in the predetermined area with a different selection image that differs from the M selection images; and
    display an additional M−1 selection images in the predetermined area of the screen, wherein
        N is an integer equal to or larger than three, and
        M is an integer equal to or larger than two and equal to or smaller than N.

2. The non-transitory computer-readable information storage medium as defined in claim 1, wherein the processor is further configured to:
    shift the selection image positioned in a predetermined direction relative to the deleted selection image in a direction opposite to the predetermined direction so that a space formed by the deletion is occupied by the shifted selection image,
    dispose an additional selection image in a space formed by the shift,
    shift the selection image positioned in the predetermined direction relative to the replaced selection images in the direction opposite to the predetermined direction so that a space formed by the replacement is occupied by the shifted selection image, and
    dispose an additional M−1 selection images in a space formed by the shift.

3. The non-transitory computer-readable information storage medium as defined in claim 1, wherein the different selection image is a selection image to which an attribute identical to that of the M selection images is assigned.

4. The non-transitory computer-readable information storage medium as defined in claim 2, wherein the different selection image is a selection image to which an attribute identical to that of the M selection images is assigned.

5. The non-transitory computer-readable information storage medium as defined in claim 1, wherein the processor is further configured to:
    determine a total number of selection images that have been replaced by a same selection image each time replacement occurs, and
    perform a process based on the total number of selection images that have been replaced by the same selection image, when the same selection image is selected, the same selection image being a different selection image in that it differs from the M selection images.

6. The non-transitory computer-readable information storage medium as defined in claim 2, wherein the processor is further configured to:
    determine a total number of selection images that have been replaced by a same selection image each time replacement occurs, and
    perform a process based on the total number of selection images that have been replaced by the same selection image, when the same selection image is selected, the same selection image being a different selection image in that it differs from the M selection images.

7. The non-transitory computer-readable information storage medium as defined in claim 3, wherein the processor is further configured to:
    determine a total number of selection images that have been replaced by a same selection image each time replacement occurs, and
    perform a process based on the total number of selection images that have been replaced by the same selection image, when the same selection image is selected, the same selection image being a different selection image in that it differs from the M selection images.

8. The non-transitory computer-readable information storage medium as defined in claim 4, wherein the processor is further configured to:
    determine a total number of selection images that have been replaced by a same selection image each time replacement occurs, and
    perform a process based on the total number of selection images that have been replaced by the same selection image, when the same selection image is selected, the same selection image being a different selection image in that it differs from the M selection images.

9. The non-transitory computer-readable information storage medium as defined in claim 1, wherein
    the program causes the touch panel device to, via the processor, receive input information that has been input through the touch panel, and
    the touch panel comprises:
        an input section that allows a user to select a selection image among the selection images, and
        a display section that displays the selection images.

10. The non-transitory computer-readable information storage medium as defined in claim 2, wherein
    the program causes the touch panel device to, via the processor, receive input information that has been input through the touch panel, and
    the touch panel comprises:
        an input section that allows a user to select a selection image among the selection images, and
        a display section that displays the selection images.

11. The non-transitory computer-readable information storage medium as defined in claim 3, wherein
    the program causes the touch panel device to, via the processor, receive input information that has been input through the touch panel, and
    the touch panel comprises:
        an input section that allows a user to select a selection image among the selection images, and
        a display section that displays the selection images.

12. The non-transitory computer-readable information storage medium as defined in claim 5, wherein
the program causes the touch panel device to, via the processor, receive input information that has been input through the touch panel, and
the touch panel comprises:
an input section that allows a user to select a selection image among the selection images, and
a display section that displays the selection images.

13. The non-transitory computer-readable information storage medium as defined in claim 1, wherein the program causes the touch panel device to, via the processor, generate an image that includes a predetermined area in which the selection images are disposed.

14. The non-transitory computer-readable information storage medium as defined in claim 2, wherein the program causes the touch panel device to, via the processor, generate an image that includes a predetermined area in which the selection images are disposed.

15. The non-transitory computer-readable information storage medium as defined in claim 3, wherein the program causes the touch panel device to, via the processor, generate an image that includes a predetermined area in which the selection images are disposed.

16. The non-transitory computer-readable information storage medium as defined in claim 5, wherein the program causes the touch panel device to, via the processor, generate an image that includes a predetermined area in which the selection images are disposed.

17. The non-transitory computer-readable information storage medium as defined in claim 9, wherein the program causes the touch panel device to, via the processor, generate an image that includes a predetermined area in which the selection images are disposed.

18. The non-transitory computer-readable information storage medium as defined in claim 1, wherein the processor is further configured to perform a predetermined action corresponding to the selected selection image, when the selected selection image is selected.

19. A touch panel device, comprising: a processor configured to:
receive, by detecting by the touch panel device, an input corresponding to a selection of a selection image from N selection images arranged in a predetermined area of a screen of the touch panel device;
implement and perform a game process corresponding to the selected selection image, wherein the game process causes a game character to make a motion or a movement corresponding to the selected selection image;
delete the selected selection image from the predetermined area;
display, on the screen, an additional selection image in the predetermined area in place of the deleted selection image;
replace, on the screen, M selection images to which an identical attribute is assigned and which are adjacently disposed in the predetermined area with a different selection image that differs from the M selection images; and
display an additional M−1 selection images in the predetermined area of the screen, wherein
N is an integer equal to or larger than three, and
M is an integer equal to or larger than two and equal to or smaller than N.

20. A server, comprising: a processor configured to:
receive, by detecting by the touch panel device, an input corresponding to a selection of a selection image from N selection images arranged in a predetermined area of a screen of a touch panel device that is connected to the server through a network;
implement and perform a game process corresponding to the selected selection image, wherein the game process causes a game character to make a motion or a movement corresponding to the selected selection image;
delete the selected selection image from the predetermined area;
display, on the screen, an additional selection image in the predetermined area in place of the deleted selection image;
replace, on the screen, M selection images to which an identical attribute is assigned and which are adjacently disposed in the predetermined area with a different selection image that differs from the M selection images; and
display an additional M−1 selection images in the predetermined area of the screen, wherein
N is an integer equal to or larger than three, and
M is an integer equal to or larger than two and equal to or smaller than N.

* * * * *